L. P. BOUVIER.
SELF SERVING TABLE.
APPLICATION FILED OCT. 11, 1920.
1,396,246.
Patented Nov. 8, 1921.
3 SHEETS—SHEET 1.
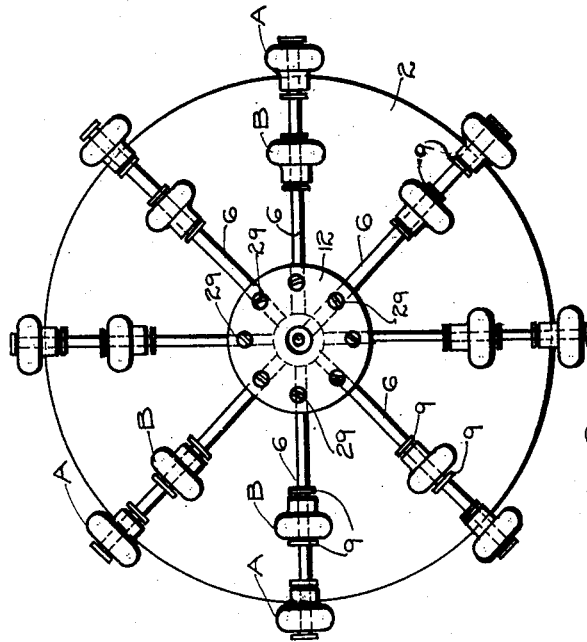
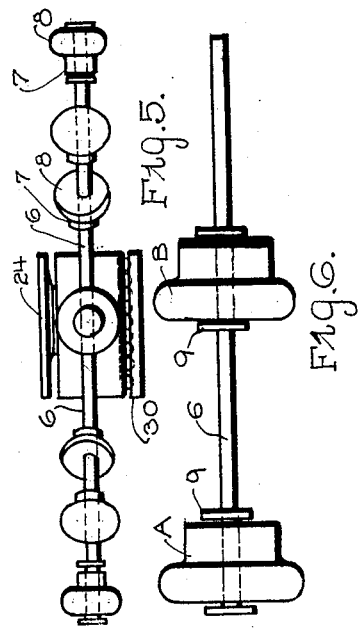
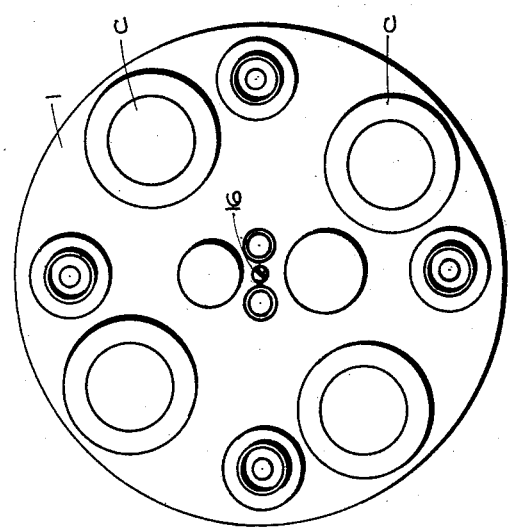
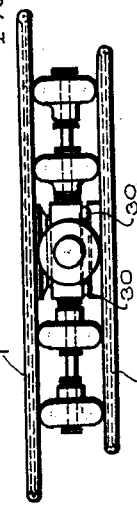
Leo P. Bouvier, INVENTOR.
BY
William E. Baff, ATTORNEY.

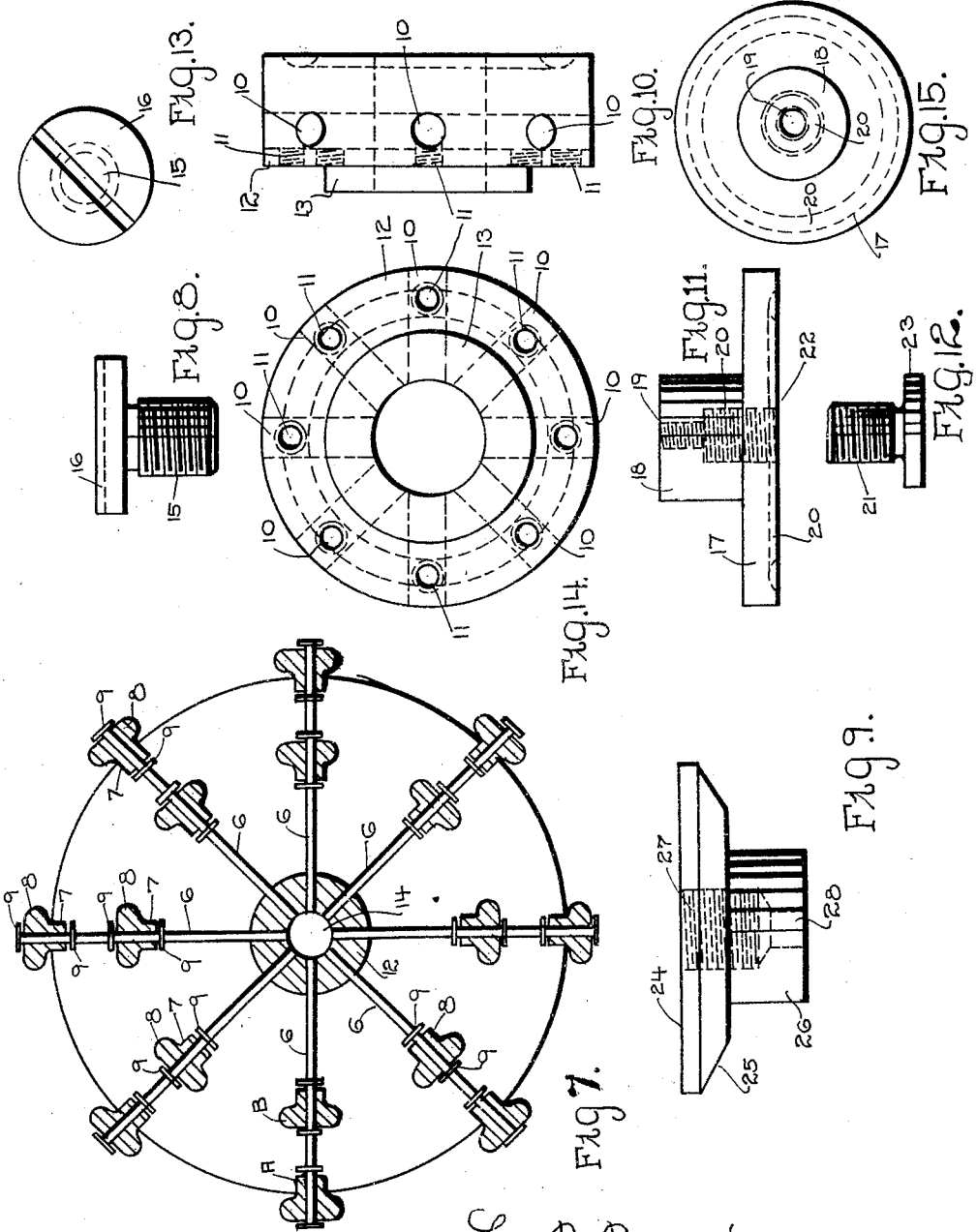

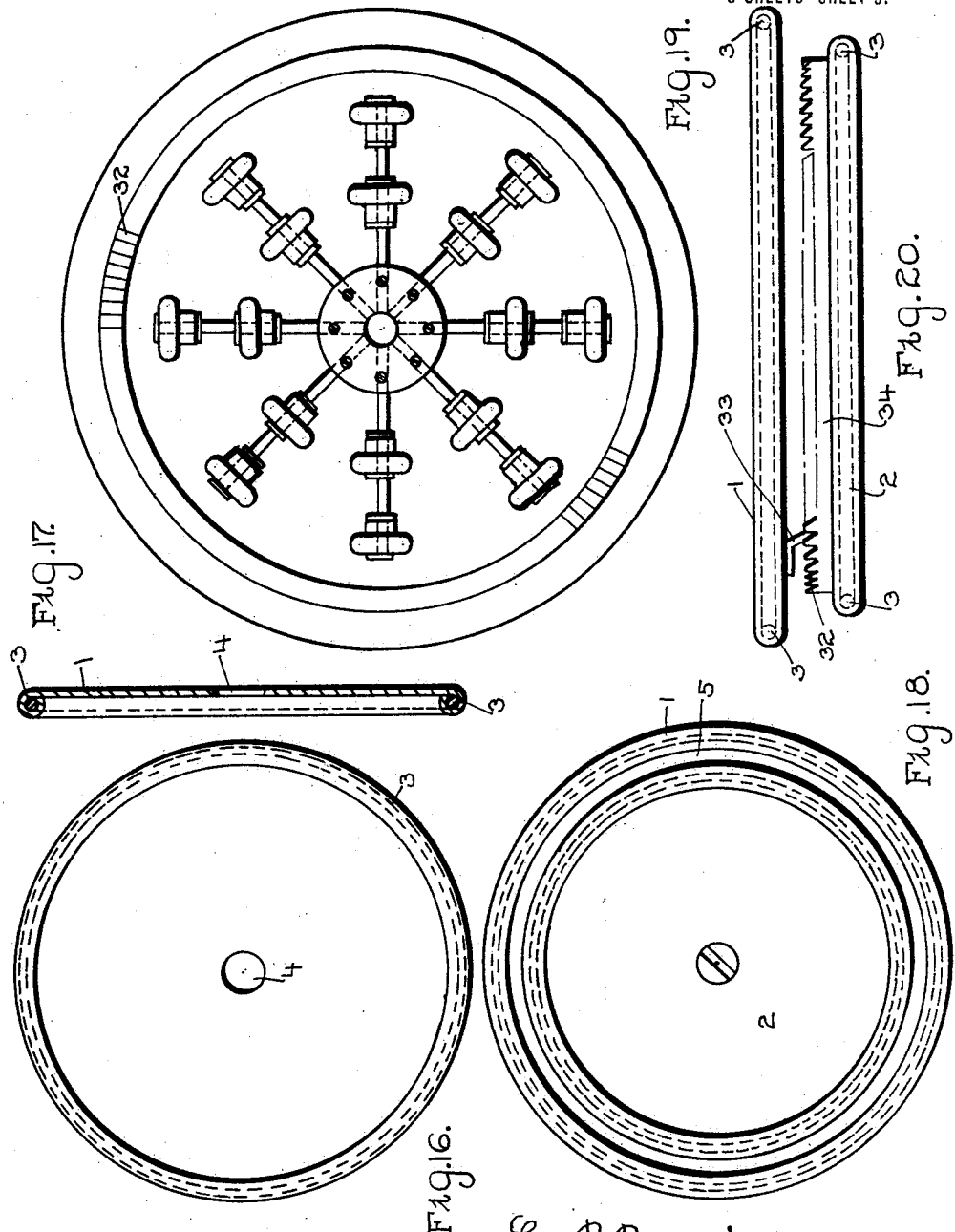

UNITED STATES PATENT OFFICE.

LEO P. BOUVIER, OF WORCESTER, MASSACHUSETTS.

SELF-SERVING TABLE.

1,396,246.  Specification of Letters Patent.  Patented Nov. 8, 1921.

Application filed October 11, 1920. Serial No. 416,274.

*To all whom it may concern:*

Be it known that I, LEO P. BOUVIER, a citizen of the United States of America, residing at the city of Worcester, in the county of Worcester and State of Massachusetts, have invented new and useful Improvements in Self-Serving Tables, of which the following is a specification.

This invention relates to improvements in devices designed to facilitate the serving of articles of food upon the table under conditions where several people are likely to make demands upon service which includes a variety of things cooked and uncooked.

Another object of my invention consists in providing a simple, inexpensive and highly efficient tray supporting various dishes and utensils and serviceable to meet the demands or requirements as well as tastes of a considerable number of people seated about a common table, this table supporting one or more of said trays..

It frequently happens at banquets, clubs affairs, hotels, restaurants as well as in the family households that various articles of food or diet are spread so far apart upon a table as to be and remain inaccessible to persons sitting thereabout. To have to reach for certain utensils or for food vegetables or fruit is inconvenient and embarrassing and to call upon others to pass certain things desired may not be desirable. To eliminate such drawbacks I have devised a self serving tray capable of revolving and of a size adapted to hold and render accessible quite a number of various dishes, utensils or foods. Being located upon the table where it is within easy and convenient reach of more than one person it enables those interested in certain things on this tray to turn the tray around to the point where the proper foods or utensil may be removed, inserted or improvised.

With the above and other objects in view my invention consists in the combination, arrangement, and details of construction disclosed in the drawings and specification, and then more particularly pointed out in the appended claims.

In the drawings wherein similar reference characters designate similar elements throughout the respective views, Figure 1 is a top plan view of my self serving tray, Fig. 2 is a side elevation thereof, Fig. 3 is a plan view thereof with the top disk removed, Fig. 4 is a side elevation of said invention partly in section, Fig. 5 is a side elevation of the roller cage and support, Fig. 6 is a detailed exaggerated view of the roller support, Fig. 7 is a cross sectional view through the cage, Fig. 8 is a detail view of a locking pin, Fig. 9 is a side view of a spool section, Fig. 10 is a side view of a rotatable bearing, Fig. 11 is a side view of another spool section, Fig. 12 is a detail view of another locking bolt, Fig. 13 is a top plan view of a locking bolt, Fig. 14 is a top plan view of Fig. 10, Fig. 15 is a top plan view of Fig. 11, Fig. 16 is a plan view of a disk, Fig. 17 is a side edge view of Fig. 16, Fig. 18 is a view in plan of both disks, Fig. 19 is a bottom plan view of the roller cage and adjacent disk and, Fig. 20 shows a modification of my invention.

Referring to the drawings which are merely illustrative of my invention 1 designates a disk or table preferably made of sheet metal formed with a circumferential bead 3, and with a central hole 4. There is another disk 2 of a slightly lesser diameter than the disk 1 to be referred to as the lower disk. C designates the various dishes, utensils or things to be served by means of my invention. The space between the two disks is designated 5. A plurality of circumferentially extending rods or arms 6 radiate outwardly and radially from a common collar 12 or rotatable bearing these rods projecting into openings formed in this collar and designated 10 in Fig. 10, the inner secured ends of these rods being held against displacement by means of tap screws 29 shown in Fig. 3, these screws engaging in top holes 11.

Journaled upon these rods or arms 10 are a number of similarly shaped and constructed rollers being made preferably of wood, each roller consisting of a sleeve 7 formed with an annular enlargement 8. this roller being held against longitudinal displacement by means of the washers 9 secured to any of the rods 6.

The collar or bearing 12 is provided with a reduced boss 13 as shown in Fig. 10. The opening formed centrally of this collar is designated 14 for the reception of a vertically disposed pin 15 which is threaded at its opposite ends. The two spool sections 17 and 24 are each provided with a broad base flange and with a concentric hub, a hub of section 17 being designated 18 formed with an internally threaded passage 19 communicating with a bore enlargement 22 or counter bore, while the hub of section 24 is designated 26 through which is formed an opening or hole that communicates with an internally threaded counter bore 27 located also in the base flange of the piece. It will now be seen that the pin 15 will project through the opening 4 of the lower disk 2 through the counter bore 22 of member or section 17, into the hole 28 of section 24 through its counterbore 27 and out of the disk 1, thereby enabling the set screws 16 and 21 to be screwed onto the threaded ends of the bolt or pin 15 and into the respective threaded counter bore 27 and 22 the heads of these set screws reaching points within the same plane with the beads 3 formed upon the respective disks 1 and 2 and serving to clamp together the sections of the spool and the upper and lower disks. The set screw 16 will be threaded however rather loosely so as to allow the upper disk or table 1 to spin around freely. A and B designate two sets of rollers mounted upon the roller cage consisting of the rods or arms 6. It will be seen that first the pin 15 will be properly positioned bottom wise up through the lower disk 2; thereafter the collar 12 will be positioned around the hub 18 of section 17, and then the section 24 will be slipped over the pin 15. The time to place the anti-friction balls 30 in the races 20 of the spool sections 24 and the collar 12 is before section 24 of the spool is positioned around the pin 15. When the arms 6 are carried around with their rollers A and B the collar 12 revolves noiselessly and freely around the spool made up of the two sections 18 and 24. Dishes or plates, etc., will be placed upon the upper disk 1 so as to be supported there upon and by turning this disk 1, the same, resting upon the rollers A and B along its peripheral edge will, when spun around, revolve the rollers causing the latter to move in a regular cycle of movement upon and around the lower disk 2. Thus any point or part of the circumference of the disk 1 may be made accessible to any person desiring to reach some article thereupon.

If it is desired to permit the upper disk or table 1 to revolve only in one and the same direction this may be done by means of the mechanism disclosed in Fig. 20, this construction showing a circumferential rack 32 formed upon the peripherial edge of one disk engaged by the yieldable spring pawl 33 carried around by the other disks. The pawl 33 will slip over any of the teeth of this rack and when stopped it will be seen that the upper table is locked against rotation. Otherwise the parts are as hitherto-fore described.

Numerous changes may be resorted to in practice without departing from the details of construction herein disclosed.

What I desire to claim and secure protection on is:—

1. In combination a pair of horizontally arranged disks, a spool arranged in two sections, a pin projecting vertically through said spool sections and through said disks, nuts screwing on the ends of said pin and clamping said spool sections and said disks together one of the sections of said spool being formed with a ball race, a collar journaled upon said spool and disposed horizontally and also being formed on its under side with a ball race, anti-friction balls lodged in both races, a series of arms radiating from said collar, and rollers held against longitudinal displacement upon each arm contacting both disks.

2. In combination, a horizontally disposed spool composed of two sections, each section consisting of a flange and a central concentric hub, one of said sections being formed with an annular shoulder upon its flange of greater diameter than said hub but of lesser diameter than said flange, the hub of said sections being arranged for rotative contact, a circular series of anti-friction balls arranged in the base of the lower section, a collar revolubly mounted around both hubs and bearing upon said anti-friction balls at one side and against said annular shoulder at another side, a pair of horizontally arranged disks overlying the upper flange and underlying the under flange, and means holding said disks in rotative engagement with the last-named flanges.

3. In combination, a pair of horizontally arranged disks, a vertical bearing arranged centrally between said disks and separating them, a pin in said bearing around which the upper disk is rotatable, a collar rotatably mounted around said vertical bearing, a radial series of rods secured into said collar, and a series of wooden rollers journaled upon said radially disposed rods, each roller consisting of a sleeve mounted upon said rod and an enlargement roller having a periphery rounded in cross-section.

LEO P. BOUVIER.

Attested:
Roy L. Powers,
W. H. Brown.